Patented Feb. 23, 1932

1,846,188

UNITED STATES PATENT OFFICE

CHARLES DE ROHDEN, OF BALTIMORE, MARYLAND, ASSIGNOR, BY MESNE ASSIGNMENTS, TO KREBS PIGMENT AND COLOR CORPORATION, OF NEWARK, NEW JERSEY, A CORPORATION OF DELAWARE

PRODUCTION OF TITANIUM PIGMENTS

No Drawing.    Application filed January 17, 1928.    Serial No. 247,464.

My invention pertains to the production of titanium pigments, and relates more specifically to a process for producing a pure white pigment from titanium dioxide.

In practice, titanium dioxide is ordinarily prepared from an acid solution of titanium sulfates by maintaining such a solution at a certain acid concentration near the boiling temperature for several hours, which procedure results in the hydrolysis of the titanium salts and the precipitation of titanium dioxide. A suitable hydrolysis process is described in Blumenfeld's Patent 1,504,672. Titanium dioxide prepared by hydrolysis is filtered from the mother liquor and is washed to remove excess acid. About 3–9% of sulfuric acid remains in close combination with the $TiO_2$, probably in an adsorbed condition, and cannot be removed by ordinary washing.

In the past, titanium pigments have been prepared by drying and calcining the filtered product above described, the presence of the acid in the product treated having no ill effect. In other instances, part or all of the adsorbed acid has first been removed by neutralization and washing, the resultant neutral or nearly neutral material being dried and calcined in the usual manner.

I have now discovered that a whiter titanium dioxide pigment may be produced if the $TiO_2$ obtained by hydrolysis is subjected to a special treatment before calcination. My invention comprises a process of digesting the titanium dioxide obtained by hydrolysis with a dilute acid at an elevated temperature, preferably near the boiling point of water. This acid digestion may be conducted in the presence of an oxidizing agent, and an improved result thereby obtained.

Suitable acids for the process include dilute halogen acids such as hydrochloric acid and hydrofluoric acid, as well as other mineral acids such as sulfuric and nitric acids. As oxidizing agents, which are preferably added in small quantities to the dilute acid during the digestion process, I may employ hypochlorite salts, chlorate salts, and similar materials. Alternatively, I may use a dilute acid containing a gaseous oxidizing agent such as chlorine, or I may pass such a gas into the dilute acid during the digestion process. If nitric acid is used, no special oxidizing agent need be added.

After the digestion process, the mixture is cooled and filtered. The moist $TiO_2$ thereby obtained is then washed to remove the digestion acid, although it must be understood that ordinary washing will not remove all of adsorbed sulfuric acid. The washed product is dried, and calcined at about 1000° C. for 15–30 minutes. In this manner a pigment is produced that is superior to any pigment producible from the same material by a process in which the acid digestion process is omitted.

If an acid-free product is desired, a slightly different procedure is adopted. The mixture undergoing acid digestion is filtered, washed to remove free acid, and the adsorbed acid in the $TiO_2$ is then neutralized by treatment with a suitable alkaline substance such as an alkali carbonate or hydroxide, ammonia, or the like.

Now, having generally described my invention, I shall give some specific examples of its use.

Example I

Titanium dioxide, obtained by the hydrolysis of titanium sulfate solution, is suspended in water at a concentration of about 300 g. $TiO_2$ per liter. About 20 cubic centimeters of hydrochloric acid (22° Bé.) per liter is then added and mixture is then heated and is maintained at a temperature of about 75–100° C. for about an hour. This acid treatment is preferably conducted in the presence of traces of chlorine, and this can conveniently be accomplished by discharging chlorine gas into the mixture at a slow rate.

At the end of an hour's treatment the mixture is cooled, filtered, and washed to remove excess acid.

The titanium dioxide thus treated and obtained is dried, and is calcined for about half an hour at about 1000° C. After cooling, it is ground in a mill to break up lumps formed during calcination. This grinding may be done in either wet or dry condition. The resultant titanium dioxide pigment is clearly superior in whiteness to other titanium pigments produced in the past. This superiority is plainly evident when the materials are compared, either in the dry form or when ground in oil.

Example II

In the operations described in Example I, the oxidizing agent (chlorine) may be omitted and a similar superior pigment may be obtained. However, the acid digestion process must, in this event, be continued for a longer period and at a temperature near boiling to achieve the same sort of result.

Example III

In the operations described in Example I, a different oxidizing agent may be employed. For example, hypochlorite or chlorate salts (preferably the sodium or potassium salts) may be added in an amount equivalent to 5–10% of the digesting acid.

Example IV

In Examples I, II and III, the hydrochloric acid used may be substituted by another mineral acid such as sulfuric acid or nitric acid, and a similar result obtained. If nitric acid is used, the digestion process proceeds about as rapidly and easily as in Example I, without the addition of any special oxidizing agent. There is no particular significance to be attached to the use of a concentration of 20 cc. of hydrochloric acid (22° Bé.) per liter of digestion mixture. 20 cc. of any of the other suitable acids will serve as well and a wide variation in quantity is permissible. For example, 15 cc. of acid per liter will give practically the same result.

Example V

In any of the foregoing examples, the $TiO_2$ resulting from the acid digestion treatment may be freed from acid before calcination if desired. In doing this, the acid digestion mixture is filtered, washed to remove excess acid, and then treated with an alkaline material to neutralize free and adsorbed acid. This may be conveniently accomplished by making an aqueous slurry of the filter cake, and adding, with stirring, a sufficient quantity of sodium carbonate or aqua ammonia to react with any traces of free acid, and with the adsorbed acid, to form soluble salts. The slurry is then filtered, washed to remove salts, dried, and calcined in the usual manner.

Example VI

The processes described in this specification may be conducted in autoclaves under elevated pressure. When operating under elevated pressures the temperature of the digestion mass may naturally be raised above 100° C.—in fact, to the boiling temperature of water under the elevated pressure used.

I am of the opinion that the improved pigment qualities of the $TiO_2$ treated by my process are due to a modification of particle structure occurring during the digestion. I am led to this view because, contrary to ordinary expectation, I have not been able to discover that my novel process adds any substance to or removes any material from the $TiO_2$ undergoing treatment. However, I expressly disclaim any and all explanations for the improved result.

In my co-pending application Serial No. 247,465 filed Jan. 17, 1928, I have described and claimed an acid digestion process in which a reducing agent is present. In my present application I desire to claim broadly the acid digestion process, in the presence or absence of an oxidizing agent, reserving claims for the digestion process in the presence of a reducing agent for my said co-pending application.

I claim:

1. A process for producing a white pigment which comprises digesting titanium dioxide in an aqueous solution containing hydrochloric acid, in the proportion of not more than about one percent, and an alkali salt of an oxygen acid of chlorine.

2. A process for producing a white pigment which comprises digesting titanium dioxide in an aqueous solution containing hydrochloric acid in the proportion of not more than about one percent, and an oxidizing agent, separating the solid material and calcining at about 1000 degrees centigrade.

3. In a process for producing a white pigment, the steps comprising digesting titanium dioxide in an aqueous solution containing hydrochloric acid in the proportion of not more than about one percent, and a hypochlorite.

4. In a process for producing a white pigment, the steps comprising digesting titanium dioxide in an aqueous solution containing hydrochloric acid in the proportion of not more than about one percent, and a chlorate.

CHARLES DE ROHDEN.